United States Patent
Jones

[11] Patent Number: 5,098,123
[45] Date of Patent: Mar. 24, 1992

[54] ELECTROTHERMAL INFLATABLE RESTRAINT SYSTEM

[75] Inventor: Trevor O. Jones, Bratenahl, Ohio

[73] Assignee: International Development Corporation, Cleveland, Ohio

[21] Appl. No.: 621,623

[22] Filed: Dec. 3, 1990

[51] Int. Cl.⁵ ................................................ B60R 21/26
[52] U.S. Cl. .................................... 280/741; 280/736; 280/740
[58] Field of Search ................. 280/728, 736, 740, 741

[56] References Cited

U.S. PATENT DOCUMENTS

| | | | |
|---|---|---|---|
| 3,695,179 | 10/1972 | Rainone et al. | 102/202.11 |
| 3,837,671 | 9/1974 | Hamilton | 280/733 |
| 3,910,595 | 10/1975 | Katter et al. | 280/732 |
| 3,966,226 | 6/1976 | Roth | 280/737 |
| 3,966,228 | 6/1976 | Neuman | 280/737 |
| 4,715,261 | 12/1987 | Goldstein et al. | 89/8 |
| 4,902,036 | 2/1990 | Zander et al. | 280/736 |
| 4,929,290 | 5/1990 | Cartwright | 149/35 |
| 4,957,035 | 9/1990 | Eskam et al. | 89/8 |
| 4,967,637 | 11/1990 | Loffler et al. | 89/1.816 |
| 5,022,674 | 6/1991 | Frantom et al. | 280/741 |
| 5,031,932 | 7/1991 | Frantom et al. | 280/741 |

Primary Examiner—Kenneth R. Rice
Attorney, Agent, or Firm—Pearne, Gordon, McCoy & Granger

[57] ABSTRACT

An electrothermal gas generating device for inflating the air cushion of an occupant restraint system of the "air bag" type. Upon sensing a deceleration above a predetermined threshold level a discharge voltage is applied between electrodes within the electrothermal device which sustains a current arc therebetween, creating a plasma jet which flows into a chamber containing a solid or liquid reactive material. The reactive material is converted into gas by the high temperature, high pressure plasma jet. The gas created then flows into and inflates the air cushion.

10 Claims, 2 Drawing Sheets

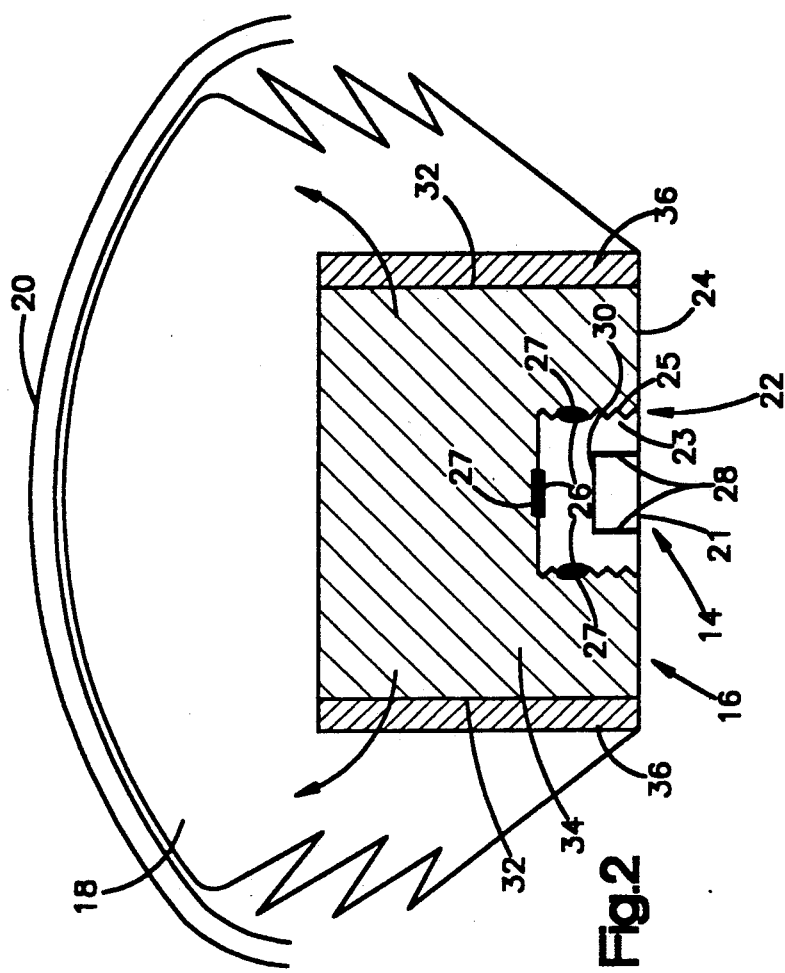
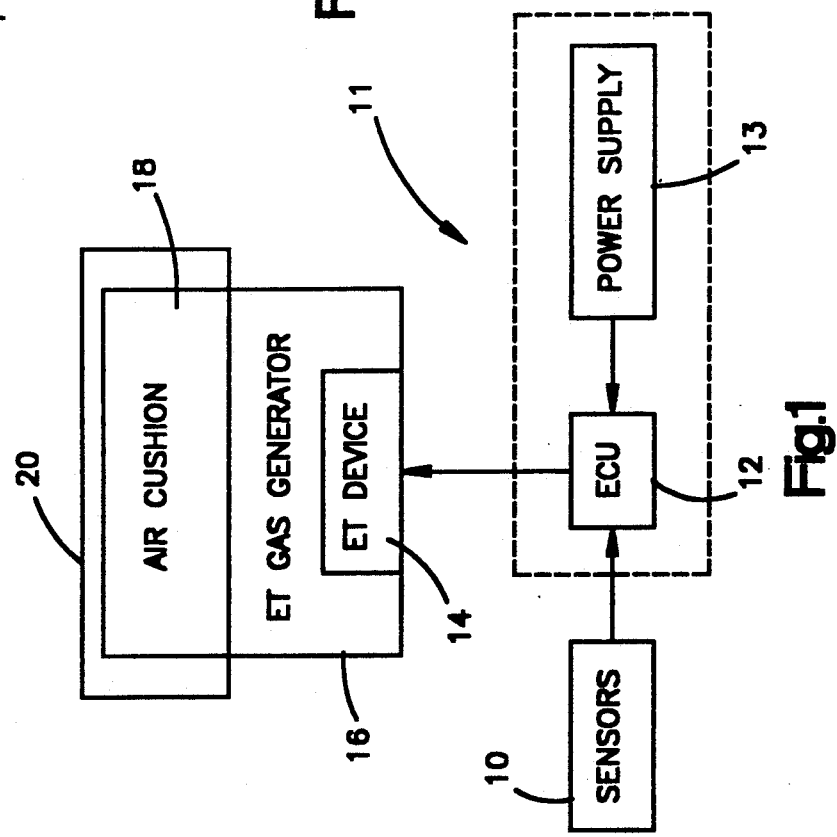

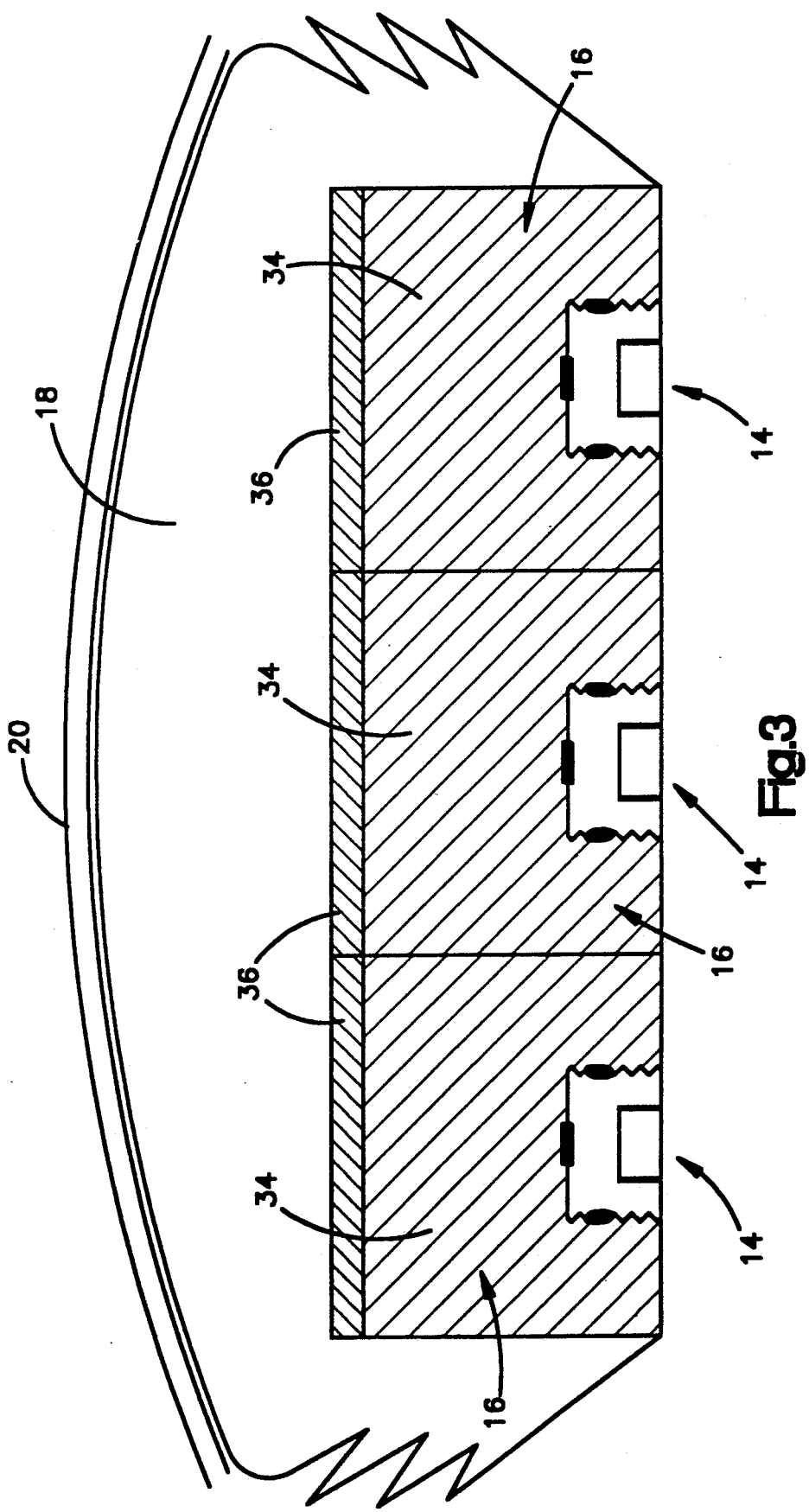

ELECTROTHERMAL INFLATABLE RESTRAINT SYSTEM

BACKGROUND OF THE INVENTION

The present invention relates generally to passive restraint systems and, more particularly, to a gas generator which uses electrothermal energy to produce gas of sufficient quantity to inflate an air cushion of an occupant restraint system of the "air bag" type.

Occupant restraint systems of the "air bag" type have been developed in response to the need to better protect occupants of automobiles from serious injuries common in vehicular accidents. To be effective as a passive restraint, the air cushion of the system must be fully inflated within approximately 50 msec., or less, of crash impact which time depends upon, among other things, the time required to sense the magnitude and position of the crash.

Throughout the evolution of "air bag" type occupant restraint systems there has been the persistent problem of a lack of suitable inflation gas generating means. This is because the gas generator must be capable of generating enough gas, up to 500 liters, to completely inflate the air bag within the 20–50 msec. of available time. The system must produce generally non-toxic and non-combustible gas to inflate the air cushion because the air cushion ultimately vents into the passenger compartment on deflation and because of the possibility of a cushion failure in an actual crash situation or during an inadvertent inflation in a non-crash condition. Also, the gas generator must be capable of lying dormant under a wide range of environmental conditions for several years without affecting the operability of the system in the event of a crash.

The goal of rapid generation of non-toxic inflation gas having long-term operability has been met with varying levels of success.

The first systems attempting to meet the requirements of a truly functional "air bag" type passenger restraint systems used high pressure stored gas to inflate the air cushion. Upon sensing a deceleration greater than a predetermined threshold level, gas from the storage container would be released, inflating the air cushion. Although these devices adequately inflated the air cushion, they had numerous disadvantages including weight, size, cost, and reliability. An example of such a device is provided by U.S. Pat. No. 3,837,671, which is incorporated herein by reference.

Pyrotechnic gas generators have also been used, wherein a propellant, such as sodium azide, is burned to generate an adequate amount of gas upon vehicle impact. An example of gas generators which burn sodium azide is provided by U.S. Pat. No. 4,929,290, which is incorporated herein by reference. The sodium azide inflator has many drawbacks. First, the basic manufacture of the propellant is hazardous, there being a significant risk of accidental fire and explosion at least until the propellant is pelletized. Second, sodium azide, when ignited, can produce harmful by-products and partially combusted materials that can burn through the cushion material of the air cushion. To prevent the partially combusted materials from injuring the occupants, a gas filter is provided and the inside of the air cushion is specially coated to resist "burn through." Further shortcomings of sodium azide inflators include undesirable size, weight, cost and the fact that it is neither readily testable nor reusable.

A third gas generating device that has been proposed is a combination of the previously mentioned stored gas and combustible propellant devices. In this scheme, the propellant is ignited and the gas generated thereby is supplemented by the stored, high pressure gas. An example of such a device is provided by U.S. Pat. No. 3,966,226, which is incorporated herein by reference.

None of the aforementioned devices is particularly attractive due to the shortcomings mentioned. These limitations make the commercial production and implementation of "air bag" type occupant restraint systems difficult. As consumer demand and governmental safety requirements continue to increase, there exists a need for a gas generating device which overcomes the limitations of those noted above.

SUMMARY OF THE INVENTION

In accordance with the present invention, an "air bag" type occupant restraint system is provided that includes a single sensor or a series of sensors mounted at various points on the automobile, the mounting points being such that a deceleration of the vehicle due to a collision may be readily sensed as to position and magnitude.

An electrothermal device is electrically connected to an electronic control unit (hereafter ECU) which receives information from the various sensors so that deceleration of a predetermined magnitude and position will be immediately communicated to the ECU to initiate the gas generation process.

The electrothermal device includes an inner hollow space forming a chamber or cavity having electrodes mounted therein. Upon command to initiate the inflation process the ECU sends a high voltage pulse to the electrodes which creates an arc between the electrodes and generates a plasma bubble or jet. The high voltage, low current pulse which initiates the gas generates process is provided by an energy storage device such as a capacitor, a group of capacitors or a battery means. The energy storage device may be integral with the ECU or separate from it.

The ECU continues to provide energy to the electrothermal device and the plasma jet is communicated via communication channels to a second chamber containing reactive material. The high temperature of the plasma jet causes the reactive material to be converted into pressurized gas which in turn travels into and inflates the air cushion. The chamber containing reactive material is in communication with the interior of the air cushion of the system via communication passages which allow the gas to flow from the chamber into the air cushion and thereby inflate the air cushion. The communication passages are provided with filters to remove particulate matter from the gas prior to inflation of the cushion. The air cushion used can be either aspirated or non-aspirated. An example of aspirated air cushions is provided by U.S. Pat. No. 3,910,595.

The reactive material is converted to pressurized gas in a non-combustion chemical reaction, unlike the prior art pyrotechnic devices. The reactive material of the present invention is stable over a wide range of environmental conditions, reacting only at high temperatures such as those crated by the plasma. Hence, manufacturing and disposal hazards occurring in devices currently in use are alleviated.

The ECU of the present invention is capable of controlling the amount of time the power supply provides energy to the electrothermal device and, correspondingly, the amount of reactive material that is converted into gas.

The time between impact and full inflation of the air bag is well within the time required of a device of this sort, even given the time needed to sense deceleration and initiate the gas generation process. Additionally, the gas produced by the gas generator is nontoxic, making passenger exposure thereto of no health concern.

BRIEF DESCRIPTION OF THE DRAWINGS

FIG. 1 is a schematic drawing of the major components of the present invention.

FIG. 2 is a detailed drawing of the electrothermal device and electrothermal gas generator of the present invention.

FIG. 3 is a detailed drawing of a second embodiment of the electrothermal gas generating device of the present invention.

DESCRIPTION OF THE PREFERRED EMBODIMENTS

Reference is now made to FIG. 1, wherein the inflatable occupant restraint system (11) is illustrated as including a single or a group of deceleration sensors (10), an electrothermal device (14), an electrothermal gas generator (16), an electronic control unit or ECU (12) with an associated electrical power supply (13), an inflatable air cushion (18) and a cover (20) which separates the air cushion from the passenger compartment and opens under inflation conditions. The power supply (13) can be in the form of capacitors, batteries or a combination thereof suitable to provide a high voltage, low current pulse to the electrothermal device, as is well known in the art of electrothermal expansion as exemplified by U.S. Pat. Nos. 4,957,035 and 4,715,261, which are incorporated herein by reference. The power supply (13) can also be integral with the ECU (12).

In response to a signal from the sensors (10), indicating that a deceleration above a predetermined maximum level and impact direction has occurred, the ECU (12) verifies the crash event for position and level and, if verified as a threshold exceeding deceleration, the ECU electrically connects the power supply (13) to the electrothermal device (14).

The threshold level of deceleration necessary to cause the sensors (10) to activate the system (11) depends upon the characteristics of the automobile in which the system is utilized. Therefore, the sensitivity of the system to activation by the sensors (10), including the sensors in the ECU (12), can be adjusted to meet the specific automobile occupant restraint system requirements, as is well known in the art.

Referring to FIG. 2, the electrothermal device (14) of the present invention includes a housing (21) designed to sealably fit within an opening (22) of a housing (24) of the electrothermal gas generator (16). In the illustrated embodiment, sealing is accomplished by the use of threads (23) of the electrothermal device housing (21) interacting with mating threads (25) of the opening (22) in the electrothermal gas generator housing (24), however, it is realized that several other equivalent methods of sealing could be utilized.

In the illustrated embodiment, the shape of the electrothermal device housing (21) and electrothermal gas generator housing (24) are provided to illustrate the relationship of the structural features of the present invention. Naturally, the shape of the electrothermal gas generator (16) and electrothermal device (14) is dependent upon the area provided or available in the host automobile. Typically, for a driver-side unit, the electrothermal gas generator (16) and electrothermal device (14) are generally annular in shape, having a circular cross section whereas a passenger-side unit is usually longer and more cylindrical in shape, while retaining the generally circular cross section.

A series of communication apertures (26) in the electrothermal device housing (21) are positioned to match corresponding apertures (27) in the housing (24) of the electrothermal gas generator (16) to allow communication there between. The aligned fluid communication apertures (26,27) are located to facilitate immediate and direct communication between the electrothermal device (14) and the electrothermal gas generator (16).

The electrothermal device (14) is generally hollow and provides electrodes (28) connected by a fusible link (30). The fusible link (30) is chosen from material having known operating characteristics so that performance is reliable and testing is possible. There are numerous types of fuse-links known in the art, the type selected depending upon the features desired. However, in the preferred embodiment the link is a thin aluminum wire.

The continued viability of the fusible link (30) can be tested by pulsing energy through it that is lower than the level necessary to vaporize it and detecting current flow therethrough. In this way, an automatic partial system test is possible, for example, each time the automobile is started or continuously during operation as part of the automobile diagnostics. The ECU (12) of the present invention also provides a full system diagnostic function to monitor the status of all elements of the system.

Reactive material (34) in a solid or liquid state is contained within the electrothermal gas generator housing (24) which surrounds the electrothermal device (14). The open ends (32) of the electrothermal gas generator housing are provided with conventional particulate filters (36), although these are not required with some reactive materials.

The reactive material (34) of the preferred embodiment can be a combination of aluminum metal powder and water gel. This combination is extremely stable over a wide range of environmental conditions, reacting only at high temperature and pressure, such as that created by the electrothermal device (14). Naturally, other reactive materials could be substituted for the one presently disclosed without going beyond the scope of the inventive concepts as embodied in the appended claims.

The operation of the electrothermal device and generator of the present invention will be described hereafter with reference to the aforementioned drawings.

Once deceleration above a predetermined threshold level is detected by sensors (10), and then transmitted to and verified by the ECU (12), the power supply (13) is connected across the electrodes (28) of the electrothermal device (14) causing the fusible link (30) to melt or vaporize, sustaining an arc between the electrodes (28), creating ionized gas or plasma as is known in the art of plasma generation. The arc between the electrodes (28) can also be formed without using the fusible wire (30) by adjusting the distance between the electrodes (28) and the voltage supplied by the power supply (13) such that voltage across the electrodes causes an arc to be formed, similar to the arc formed by vaporization of the fusible wire.

The high temperature plasma jet exits the electrothermal device (14) via the communication apertures (26,27) and enters the electrothermal gas generator (16). The plasma jet converts the reactive material (34) into gas which then flows through the communication passages (32) of the electrothermal gas generator housing (24), through the filters (36) and into the air cushion (18). The filters (36) remove any particulate matter from the gas before it enters the air cushion (18). As the air cushion pressurizes, it breaks through the cover (20) and enters the passenger compartment to restrain and protect the occupants therein. The gas cools as it flows into the air cushion (18), thereby lessening the risk of burns to the occupant.

The length of time the power supply (13) is connected to the electrothermal device (14) is controlled by the ECU (12). This control function is important in that it indirectly determines the pressure to time relationship of the generated gas which must be optimized for the specific vehicle and the expected occupant kinematics. The ECU can stop inflation of the air cushion (18) by disconnecting the power supply (13) from the electrothermal device (14). By controlling the length of time the plasma forming voltage is available, it is possible to have controlled generation of gas. Hence, the pressure and the amount or volume of gas generated and flowing into the air cushion is controlled by adjusting the time the power supply is connected to the electrothermal device. In this way, the pressure and the amount of gas generated can be customized to the air cushion requirements of the particular host automobile under crash conditions.

It is important to note that the gas created by this process cools quickly as it fills the air cushion. The lower temperature eliminates the risk of burns to the occupant as the gas normally vents to the passenger compartment or in case of a cushion failure.

In the preferred embodiment, the system can be recharged after use, thereby making it reusable. This is accomplished by removing the electrothermal device (14) and replacing the fusible link (30) between the electrodes (28), replenishing the reactive material (34) within the electrothermal gas generator (16) and replacing the filters (36) if contaminated, with new ones.

In a second embodiment, as shown in FIG. 3, the inflatable occupant restraint system (11) is provided with several independent electrothermal gas generators (16) and electrothermal devices (14). Although all of the electrothermal gas generators (16) are in communication with the air cushion (18) via their respective filters (36), only one electrothermal device (14) is activatable by the ECU (12). After the reactive material (34) in the first electrothermal gas generator (16) is used to generate gas, the next electrothermal device can be electrically connected to the ECU to ready the system for use. In this manner, the system (11) is capable of use in several crashes without the need for replacement or recharge.

In a similar fashion, the electrothermal devices (14) are capable of being simultaneously activated and controlled by the ECU (12), activation of any device depending upon the intensity and direction of the sensed deceleration. The logic of the ECU would determine which, if any, of the chambers were necessary to inflate the air cushion. In this way, the cushion would be capable of controlled inflation rather than a mandatory complete inflation. The device would also be capable of multiple inflations in the event of a secondary impact, as is somewhat common in vehicular accidents.

While there has been described and illustrated one specific embodiment of the invention, it is clear that the description of the present invention is by way of example and variation therein can be made without changing the inventive concept as embodied in the claims attached hereto. For example, there are numerous ways of generating an arc between the electrodes of the present invention, such as directly between the electrodes without the use of a fuse link the described method being the method preferred by applicant.

Also, in the preferred embodiment, as disclosed above, it is possible to place the entire sensor function with the ECU. It is also possible to integrate the ECU, power supply, sensors, electrothermal device and gas generator into a single unit. Therefore, the entire inflatable occupant restraint system could be manufactured and installed as a unit, making installation and replacement a simple matter.

What I claim is:

1. An occupant restraint system of the air bag type comprising one or more deceleration sensors, a control unit responsive to said sensors, an electrical power supply regulated by said control unit, an inflatable occupant restraint cushion, a means for forming plasma connectable to said power supply, and a means for generating gas in fluid communication with said plasma forming means, said gas generating means including a reactive material, wherein a signal from said sensor causes the control unit to activate said plasma forming means which generates plasma, said plasma being communicated to said reactive material, said reactive material being heated by said plasma and converted into gas which inflates said inflatable cushion.

2. An occupant restraint system of the air bag type comprising one or more deceleration sensors, a control unit responsive to said sensors, an electrical power supply regulated by said control unit, an inflatable occupant restraint cushion, a means for forming plasma connectable to said power supply, and a means for generating gas in fluid communication with said plasma forming means, said plasma forming means including at least a pair of electrodes, said gas generating means including a reactive material, wherein a signal from said sensor causes the control unit to place a voltage from said power supply across said pair of electrodes thereby forming plasma, said plasma being communicated to said reactive material, said reactive material being heated by said plasma and converted into gas which inflates said inflatable cushion.

3. An occupant restraint system of the air bag type comprising one or more deceleration sensors, a control unit responsive to said sensors, an electrical power supply regulated by said control unit, an inflatable occupant restraint cushion, a means for forming plasma connectable to said power supply, and a means for generating gas in fluid communication with said plasma forming means, said plasma forming means including at least a pair of electrodes and a fusible wire, said gas generating means including a reactive material, wherein a signal from said sensor causes the control unit to place a voltage from said power supply across said fusible wire, vaporizing the wire and thereby forming plasma, said plasma being communicated to said reactive material, said reactive material being heated by said plasma and converted into gas which inflates said inflatable cushion.

4. An occupant restraint system according to claim 2, wherein said plasma forming means further comprises a fusible wire connecting said pair of electrodes and a first housing surrounding said pair of electrodes, said first housing having a fluid communication aperture formed therein to allow plasma formed within the housing to exit.

5. An occupant restraint system according to claim 4, wherein said gas generating means further comprises a second housing, said second housing defining an opening adapted to sealably accept said first housing, said second housing being in communication with the interior of said first housing via said communication apertures, said second housing further being in fluid communication with said inflatable cushion.

6. An occupant restraint system according to claim 5, wherein said reactive material is contained within said second housing.

7. An occupant restraint system according to claim 6, wherein said communication apertures allow said plasma formed within said first housing to flow into said second housing so as to heat said reactive material and convert it into gas.

8. An occupant restraint system as recited in claim 7, wherein said second housing provides openings to allow said gas formed by said plasma and said reactive material to flow into said inflatable bag.

9. An occupant restraint system as recited in claim 8, wherein said openings include filters adapted to remove particulate matter from said gas as it enters said bag.

10. A method of inflating an inflatable cushion for use in a vehicular occupant restraint system of the air bag type, comprising the steps of:
   sensing a vehicle deceleration above a predetermined threshold level;
   forming a plasma in response to said sensed deceleration by connecting a power supply voltage across a plasma generating means;
   communicating said plasma to a solid or liquid reaction material so as to heat said reactive material and electrothermally convert it into gas; and
   communicating said gas to said inflatable cushion whereby said cushion is inflated by said gas.

* * * * *